United States Patent
Kuraki et al.

(10) Patent No.: US 10,236,979 B2
(45) Date of Patent: Mar. 19, 2019

(54) TRANSMITTER, RECEIVER, COMMUNICATION SYSTEM, AND TRANSMISSION AND RECEPTION METHODS

(71) Applicant: FUJITSU LIMITED, Kawasaki-shi, Kanagawa (JP)

(72) Inventors: Kensuke Kuraki, Ichikawa (JP); Keizo Kato, Kawasaki (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 15/383,272

(22) Filed: Dec. 19, 2016

(65) Prior Publication Data
US 2017/0099104 A1 Apr. 6, 2017

Related U.S. Application Data

(63) Continuation of application No. PCT/JP2014/067379, filed on Jun. 30, 2014.

(51) Int. Cl.
*H04B 10/00* (2013.01)
*H04B 10/116* (2013.01)
*H04J 14/00* (2006.01)

(52) U.S. Cl.
CPC .................... *H04B 10/116* (2013.01)

(58) Field of Classification Search
CPC ..................................................... H04B 10/116
See application file for complete search history.

(56) References Cited

U.S. PATENT DOCUMENTS 5,061,998 A 10/1991 Yasuki et al.
5,917,634 A * 6/1999 Otobe .................. G02B 6/4204
250/574

(Continued)

FOREIGN PATENT DOCUMENTS

JP 5525664 6/1820
JP 3-10483 1/1991

(Continued)

OTHER PUBLICATIONS

Japanese Office Action dated Aug. 8, 2017 in corresponding Japanese Patent Application No. 2016-530697.

(Continued)

*Primary Examiner* — Daniel G Dobson
(74) *Attorney, Agent, or Firm* — Staas & Halsey LLP

(57) ABSTRACT

A transmitter includes a light source which enables changing the characteristic of light, on a time-series basis, and a controller which sets a predetermined duration for a symbol included in information to be transmitted and controls the light source to change the characteristic of the light emitted by the light source, on a time-series basis in accordance with a value of the symbol in the duration. A receiver includes a camera which generates a plurality of images each recording an image capturing range including at least a part of an area irradiated with the light from the transmitter, with a predetermined image capturing period, and a processor configured to extract a feature amount representing the characteristic of the light, from each of the plurality of images, and decode the value of the symbol from a time-series change in the feature amount.

9 Claims, 10 Drawing Sheets

(56) References Cited

U.S. PATENT DOCUMENTS

| | | |
|---|---|---|
| 2011/0150285 A1 | 6/2011 | Kimura |
| 2012/0275796 A1 | 11/2012 | Yokoi |
| 2013/0083313 A1 | 4/2013 | Iizuka |
| 2013/0330088 A1 | 12/2013 | Oshima et al. |
| 2014/0186048 A1 | 7/2014 | Oshima et al. |
| 2014/0241732 A1 | 8/2014 | Ishida et al. |
| 2015/0003837 A1 | 1/2015 | Lee |
| 2015/0023669 A1* | 1/2015 | Jiang .................. H04B 10/116 398/118 |

FOREIGN PATENT DOCUMENTS

| | | |
|---|---|---|
| JP | 2009-88704 | 4/2009 |
| JP | 2010-41476 | 2/2010 |
| JP | 2013-77244 | 4/2013 |
| JP | 2013-115497 | 6/2013 |
| JP | 2013-255253 | 12/2013 |
| JP | 5525664 B1 | 4/2014 |
| WO | 2008/068544 A1 | 6/2008 |
| WO | 2009/136312 A1 | 11/2009 |
| WO | 2010/021273 A1 | 2/2010 |
| WO | 2013/100743 A1 | 7/2013 |
| WO | 2013/109934 A1 | 7/2013 |

OTHER PUBLICATIONS

Office Action dated Jan. 23, 2018 in corresponding Japanese Patent Application No. 2016-530697, 11 pp.
Extended European Search Report dated May 12, 2107 in corresponding European Application No. 14896604.7.
Office Action dated Apr. 3, 2018, in corresponding Japanese Patent Application No. 2016-530697, 10 pgs.
Shinichiro Haruyama, "Visible Light Communication", IEICE Transactions, vol. J86-A, No. 12, Dec. 2003, pp. 1284-1291.
Fujitsu Laboratories Ltd., Press Release (Gijutsu), Jun. 2012, printed from pr.fujitsu.com/jp/news/2012/06/4-1.html on Aug. 4, 2014, pp. 1-4.
International Search Report dated Aug. 19, 2014 in corresponding International Application No. PCT/JP2014/067379, pp. 1-4.
Office Action dated Apr. 27, 2018 in corresponding Chinese Patent Application No. 201480080270.6, 24 pgs.
Office Action dated Dec. 4, 2018 in corresponding Japanese Patent Application No. 2018-046766.

* cited by examiner

FIG. 1
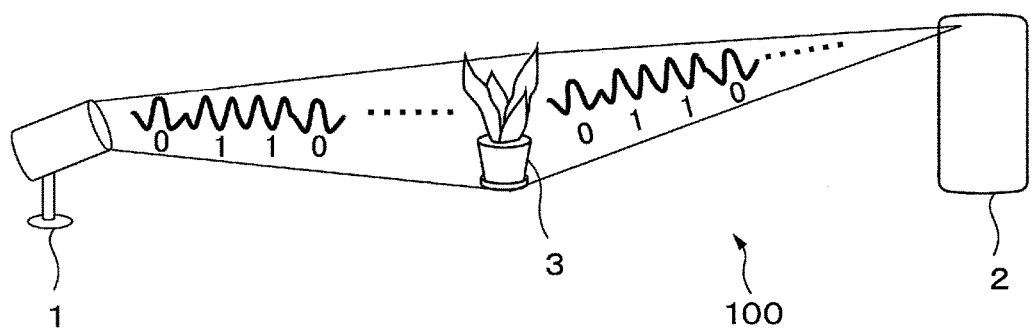
FIG. 2
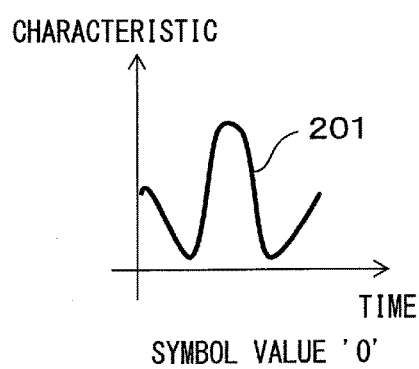
SYMBOL VALUE '0'
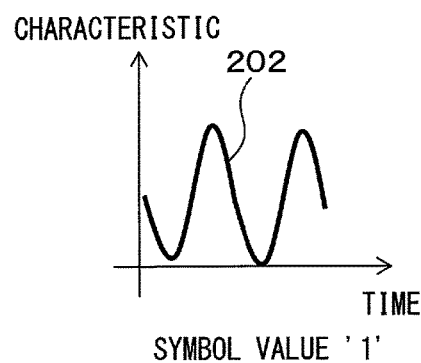
SYMBOL VALUE '1'

FIG. 3
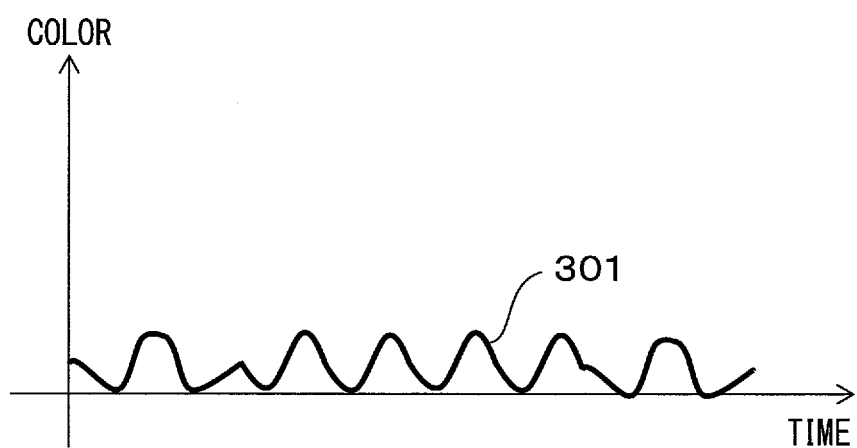
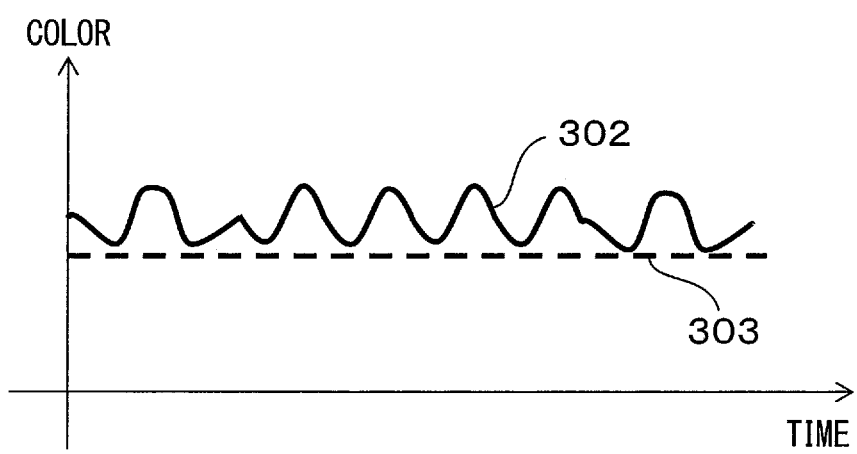

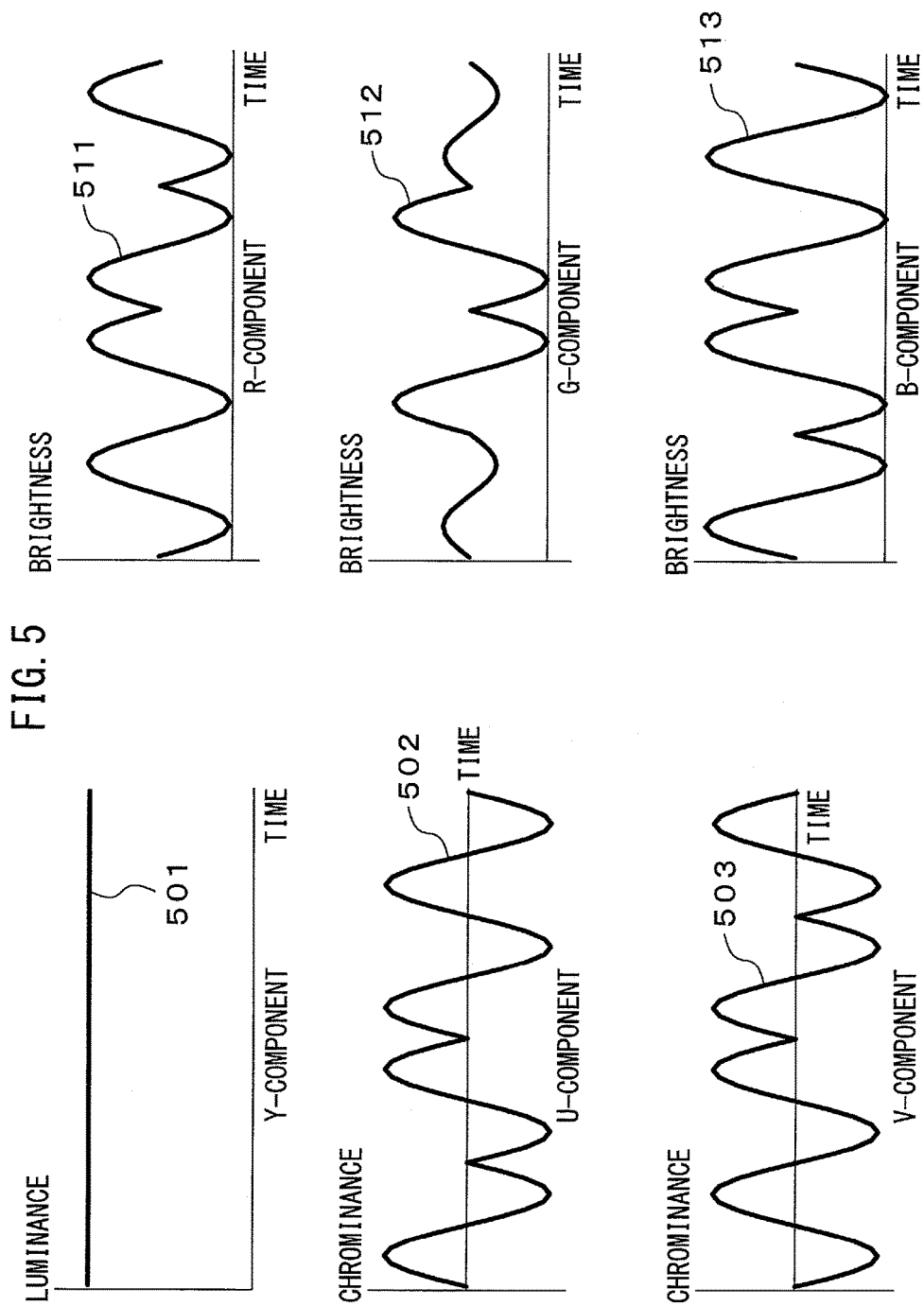

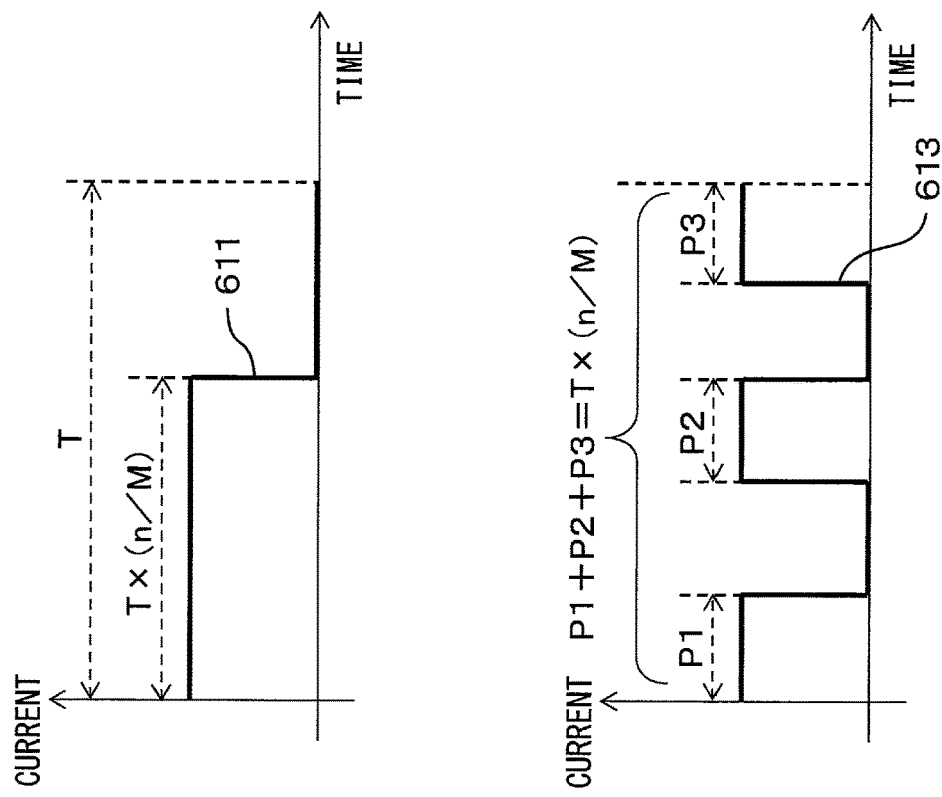
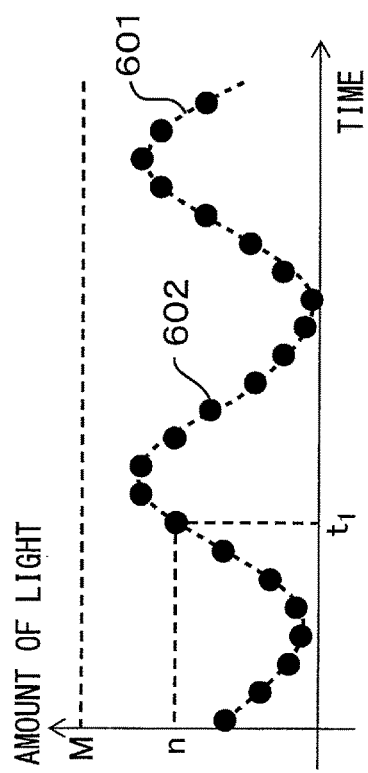

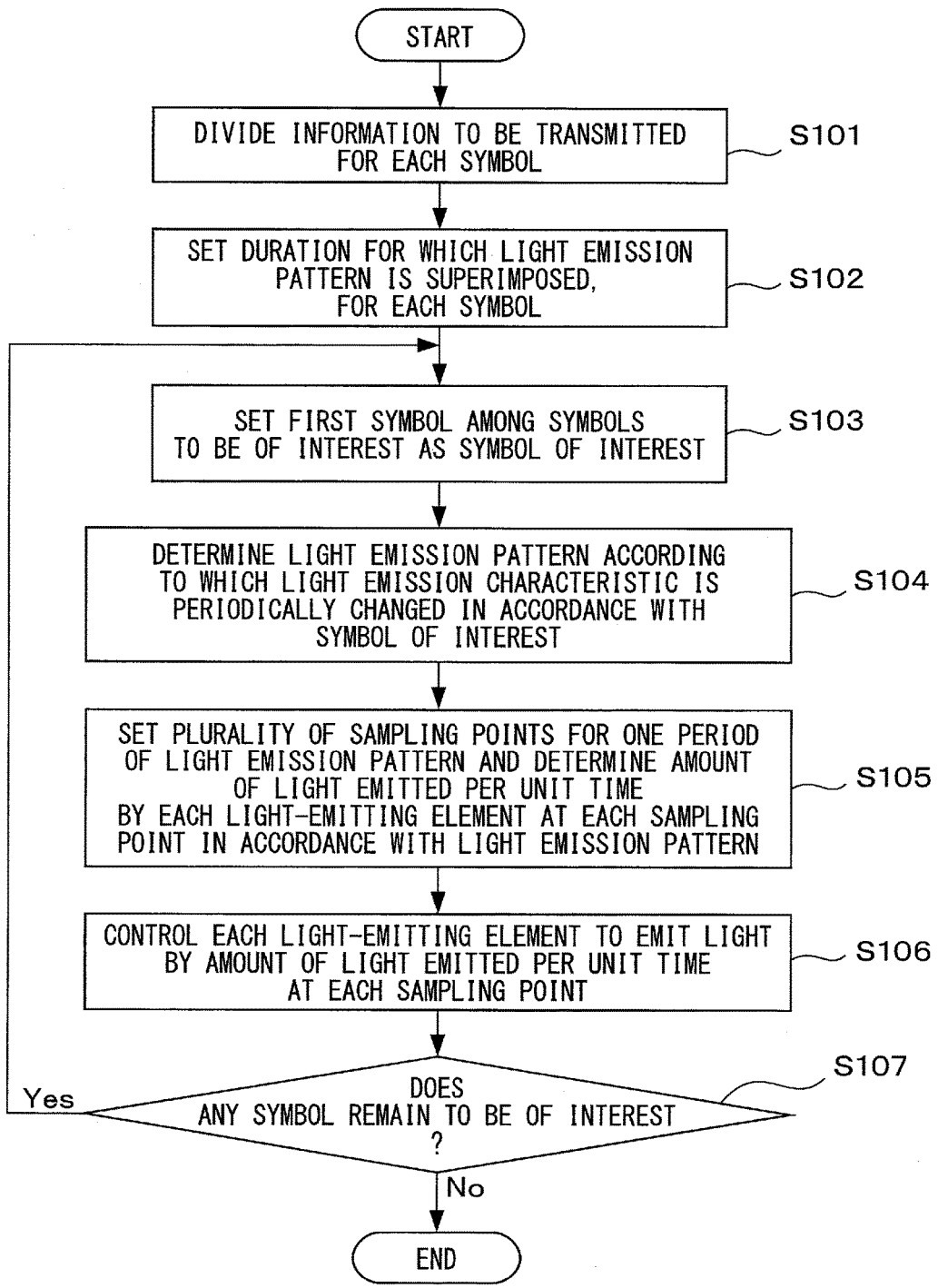

TRANSMITTER, RECEIVER, COMMUNICATION SYSTEM, AND TRANSMISSION AND RECEPTION METHODS

CROSS-REFERENCE TO RELATED APPLICATION

This application is a continuation application of International Application PCT/JP2014/067379, filed on Jun. 30, 2014 and designated the U.S., the entire contents of which are incorporated herein by reference.

FIELD

The present invention relates to, e.g., a communication system which transmits a signal using light, a transmitter, a receiver and transmission and reception methods used in such a communication system.

BACKGROUND

Conventionally, a Light Emitting Diode (LED) has been widely employed as an illumination light source. A LED has a feature that a response speed is faster than those of an incandescent bulb or a fluorescent lamp. A visible light communication technique is under study which exploits this feature to blink a LED at a rate imperceptible to the human eyes to superimpose information on illumination light emitted by the LED and perform communication (see, e.g., non-patent literature 1).

Visible light communication is considered to be used for, e.g., the purposes of communication at locations where the use of radio waves is restricted, information delivery limited to the range in which light propagates, such as an indoor space, or an Intelligent Transport System (ITS).

For example, an information transmission system disclosed in patent literature 1 includes a light-emitting means for illuminating a predetermined region to transmit information, and a light-receiving means for decoding the information from images obtained by capturing the predetermined region on a time-series basis. In the information transmission system, the predetermined region emits light modulated in color by multilevel-coded modulation to at least three levels in accordance with the information, and the light-receiving means decodes the information on the basis of multilevel-coded color modulation information of the predetermined region.

An optical module has further been proposed which includes at least two primary light sources that emit primary color light and modulates the color coordinates of the light emitted by the primary light sources in accordance with data to be embedded, to incorporate the data in the light (see, e.g., patent literature 2). Since the sensitivity of the human eye to changes in color is lower than changes in intensity, the use of the optical module for an illumination system allows embedding of data in emitted light without degrading the function of illumination.

CITATION LIST

Patent literature 1: Japanese Unexamined Patent Publication (Kokai) No. H3-10483
Patent literature 2: International Publication No. WO 2009/136312

Non-Patent Literature

Non-patent literature 1: Haruyama, "Visible Light Communication," IEICE Transactions, Vol. J86-A, No. 12, pp. 1284-1291, December 2003

SUMMARY

However, in the technique disclosed in patent literature 1, the values of data to be transmitted are assigned for each color. In the technique disclosed in patent literature 2 as well, logical values represented by one or more bits are assigned to individual sets of color coordinates. In the techniques disclosed in patent literatures 1 and 2, therefore, it may be preferable for a receiving-side device to directly receive light emitted by a transmitting-side device so that the receiving-side device accurately decodes information superimposed on the light emitted by the transmitting-side device. When the receiving-side device may not directly receive light emitted by the transmitting-side device and, for example, light emitted by the transmitting-side device is reflected or scattered by an object, the reflected or scattered light is received by the receiving-side device, the color of the received light may be different from the original color due to the presence of the object. When the color of the received light is different from that of the light emitted by the transmitting-side device, the color of the received light does not correspond to the value of data included in the superimposed information, and it is, therefore, difficult for the receiving-side device to accurately decode the information superimposed on the light emitted by the transmitting-side device.

According to an embodiment, a transmitter is provided. The transmitter includes an illumination unit which enables changing a characteristic of light emitted by the illumination unit, on a time-series basis, and a control unit which sets a predetermined duration for a symbol included in information to be transmitted and controls the illumination unit to change the characteristic of the light emitted by the illumination unit, on a time-series basis in accordance with a value of the symbol in the duration.

According to another embodiment, a receiver is provided. The receiver includes an image capturing unit which generates a plurality of images each recording an image capturing range with a predetermined image capturing period, a feature extraction unit which extracts a feature amount representing a characteristic of light emitted by a transmitter, changed on a time-series basis in accordance with a value of a symbol included in information to be transmitted, from each of the plurality of images generated by the image capturing unit, and a decoding unit which decodes the value of the symbol from a time-series change in the feature amount extracted from each of the plurality of images included in a duration set in accordance with the symbol.

According to still another embodiment, a communication system including a transmitter and a receiver is provided. In the communication system, the transmitter includes an illumination unit which enables changing a characteristic of light emitted by the illumination unit, on a time-series basis, and a control unit which sets a predetermined duration for a symbol included in information to be transmitted and controls the illumination unit to change the characteristic of the light emitted by the illumination unit, on a time-series basis in accordance with a value of the symbol in the duration. The receiver includes an image capturing unit which generates a plurality of images each recording an image capturing range including at least a part of an area irradiated with the light from the transmitter, with a predetermined image capturing period, a feature extraction unit which extracts a feature amount representing the characteristic of the light emitted by the transmitter, changed on a time-series basis in accordance with the value of the symbol, from each of the plurality of images generated by the image capturing unit, and a decoding unit which decodes the value of the symbol from a time-series change in the feature amount extracted from each of the plurality of images included in a duration set in accordance with the symbol.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view illustrating the schematic configuration of a communication system according to an embodiment.

FIG. 2 illustrates graphs representing exemplary relationships between the light emission pattern and the value of a symbol to be superimposed.

FIG. 3 illustrates graphs for explaining the influence on the light emission pattern due to reflection or scattering, by an object, of light emitted by a transmitter.

FIG. 5 illustrates graphs representing exemplary relationships between the temporal change in value of each component in a YUV color space and the temporal change in value of each component in an RGB color space, according to the light emission pattern.

FIG. 6A is a graph illustrating a temporal change in light emission intensity of a light-emitting element, determined in accordance with the light emission pattern.

FIG. 6B illustrates graphs for explaining the relationships between the amount of light emitted by a light-emitting element and the duration for which a current is supplied to the light-emitting element, in PWM.

FIG. 7 is a flowchart illustrating the operation of transmission process.

DESCRIPTION OF EMBODIMENTS

Figure 4:
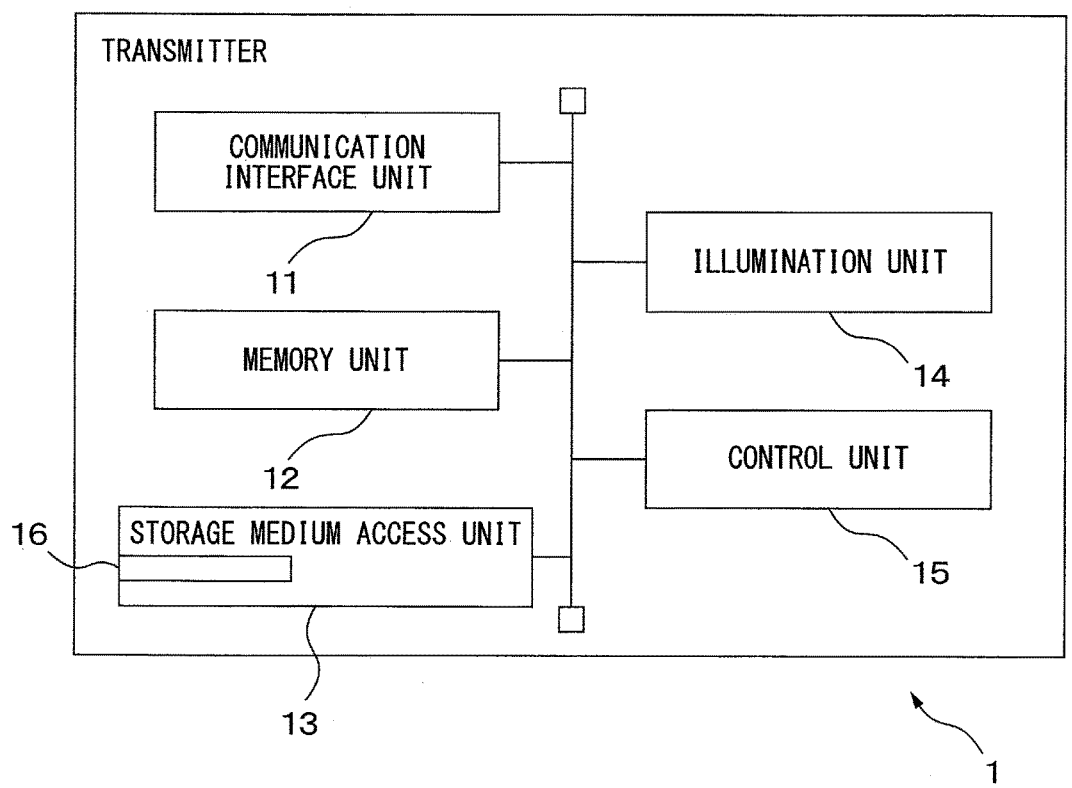
FIG. 4 is a block diagram illustrating the schematic configuration of a transmitter used in the communication system illustrated as FIG. 1.

A communication system and a transmitter and a receiver used in the communication system will be described below with reference to the drawings. In the communication system, the transmitter changes the characteristic of light emitted by an illumination unit on a time-series basis in accordance with a value of a symbol included in information to be transmitted. In doing this, the transmitter varies the light emission pattern that is a pattern representing a time-series change in characteristic of the light, in accordance with a value of a symbol included in information to be transmitted.

Thus, even when the receiver may not directly receive light emitted by the transmitter and receives light reflected or scattered by any object, it can decode information superimposed on the light by extracting the pattern representing a time-series change in characteristic of the received light.

FIG. 1 is a view illustrating the schematic configuration of a communication system according to an embodiment. A communication system 100 includes a transmitter 1 and a receiver 2. The transmitter 1 superimposes information to be transmitted on light emitted by an illumination unit of the transmitter 1. The receiver 2 includes an image capturing unit and decodes the information superimposed on light emitted by the transmitter 1, from a plurality of time-series images obtained by continuously capturing an image capturing range including an object 3 illuminated with the light, on a time-series basis by the image capturing unit. In this example, the communication system 100 includes only one receiver 2, but the number of receivers 2 included in the communication system 100 is not limited to one. The communication system 100 may include a plurality of receivers 2.

FIG. 2 illustrates graphs representing exemplary relationships between the light emission pattern and the value of a symbol to be superimposed. In FIG. 2, the abscissa represents time and the ordinate represents the characteristic of light emitted by the transmitter 1. Light emission patterns 201 and 202 correspond to symbol values '0' and '1', respectively. In the light emission patterns 201 and 202, the characteristic of light periodically changes over time, but the light emission patterns 201 and 202 are set out of phase with each other by 180°. In this manner, by varying the phase in a temporal change in light characteristic for each symbol value, the transmitter 1 can superimpose information on light emitted by the illumination unit. The relationships between light emission patterns and symbol values are not limited to this example. The relationships between light emission patterns and symbol values will be described in detail later.

FIG. 3 illustrates graphs for explaining the influence on the light emission pattern due to reflection or scattering, by an object, of light emitted by a transmitter. Referring to FIG. 3, a graph 301 represents a temporal change of light emitted by the illumination unit of the transmitter 1, according to the light emission pattern. In this example, the color of light emitted by the illumination unit changes on a time-series basis. A graph 302 represents a temporal change of light obtained by reflection or scattering, by the object 3, of light from the illumination unit of the transmitter 1. Unless the object 3 itself changes its color on a time-series basis, the color of the object 3 stays the same, as indicated by a dotted line 303. Even when the color of light itself changes due to reflection or scattering by the object 3, the change pattern of the reflected or scattered light on a time-series basis is identical to the light emission pattern. Therefore, even when the receiver 2 receives light emitted by the illumination unit of the transmitter 1 and reflected or scattered by the object 3, it can decode information superimposed by the transmitter 1 on light emitted by the illumination unit by analyzing the frequency characteristics of the change pattern of the received light to identify a light emission pattern.

FIG. 4 is a block diagram illustrating the schematic configuration of the transmitter 1. The transmitter 1 includes a communication interface unit 11, a storage unit 12, a storage medium access unit 13, an illumination unit 14, and a control unit 15. The transmitter 1 superimposes information to be transmitted, which is acquired via the communication interface unit 11 or the storage medium access unit 13 or stored in the storage unit 12 in advance, on light to be emitted by the illumination unit 14 and transmits the information.

The communication interface unit 11 includes, e.g., a communication interface for connecting the transmitter 1 to a wired or wireless communication network, and its control circuit. The communication interface unit 11 transfers information received from another device via the communication network to the control unit 15.

The storage unit 12 includes, e.g., a read-only nonvolatile semiconductor memory and a readable/writable volatile semiconductor memory. The storage unit 12 stores, e.g., information to be transmitted, which is acquired via the communication interface unit 11 or read from the storage medium access unit 13. The storage unit 12 further stores various types of information and programs used by the control unit 15 to perform transmission process. For example, for each symbol value, the storage unit 12 stores data representing a light emission pattern corresponding to the symbol value. The data representing a light emission pattern may include, e.g., the phase of the light emission pattern at the start of the control of the light, the period, and the light emission color or the amount of light corresponding to the maximum and minimum values of the characteristic of the light from the illumination unit 14 according to the light emission pattern. When the information to be transmitted is fixed, the storage unit 12 may store, in advance, data representing the light emission pattern of each symbol included in the information.

The storage medium access unit 13 is, e.g., a device which accesses a storage medium 16 such as a magnetic disk, a semiconductor memory card, and an optical storage medium. The storage medium access unit 13, for example, reads and transfers to the control unit 15, information to be transmitted or a computer program for transmission process, to be executed on the control unit 15, stored on the storage medium 16.

The illumination unit 14 includes at least one light-emitting element which can change a characteristic of light emitted by the illumination unit 14, on a time-series basis, and a driving circuit. The driving circuit drives the at least one light-emitting element to change a characteristic of light emitted by the at least one light-emitting element, in accordance with a control signal from the control unit 15.

The characteristic of light changeable on a time-series basis may be, e.g., light emission color. In this case, the illumination unit 14 includes, e.g., at least two types of light-emitting elements having different light emission colors, such as at least two types of LEDs among red, green, and blue LEDs. As the ratio of the amounts of light emitted by the respective light-emitting elements changes on a time-series basis, the color of light emitted by the illumination unit 14 also changes on a time-series basis. Alternatively, the illumination unit 14 may include at least one light-emitting element whose light emission color itself can be modulated. A light-emitting element whose light emission color itself can be modulated can be implemented in, e.g., a combination of a light-emitting element which emits light containing a plurality of wavelengths, such as a fluorescent lamp, and an optical modulation element which can adjust the transmittance for each wavelength of light, such as a liquid crystal panel including an array of color filters.

The characteristic of light changeable on a time-series basis may also be amount of light per unit time. In this case, the illumination unit 14 includes at least one light-emitting element whose amount of light can be changed on a time-series basis, such as a white LED or an organic Electro Luminescence (EL) element.

The characteristic of light changeable on a time-series basis may be a combination of light emission color and amount of light.

The illumination unit 14 superimposes information to be transmitted on light emitted by the illumination unit 14 by changing the characteristic of the emitted light on a time-series basis in accordance with a light emission pattern according to the value of each symbol included in the information, in accordance with a control signal from the control unit 15.

The control unit 15 includes one or more processors and its peripheral circuit. The control unit 15 controls the overall transmitter 1. When the control unit 15 receives information to be transmitted via the communication interface unit 11 or from the storage medium access unit 13, it temporarily stores the information in the storage unit 12. In transmission process, the control unit 15 reads the information to be transmitted from the storage unit 12 and divides the information for each symbol. The control unit 15 reads data representing a light emission pattern corresponding to the symbol value from the storage unit 12, for each symbol and controls the illumination unit 14 to change the characteristic of light emitted in accordance with the light emission pattern, on a time-series basis.

The timing of transmission process may be preset. Alternatively, the control unit 15 may start transmission process, by operation from a user interface unit (not illustrated) or in accordance with a start instruction signal for transmission process from another device, received via the communication interface unit 11. The control unit 15 may repeat transmission process for each predetermined period.

The control of the illumination unit 14 and light emission patterns will be described in detail below.

In this embodiment, the light emission pattern is defined as, e.g., a periodical change pattern according to which the characteristic of light sinusoidally changes with time, as depicted as FIG. 2. The light emission pattern is not limited to this example, and may be defined as, e.g., a pattern according to which the characteristic of light periodically changes in a triangular or rectangular pulse shape. The light emission pattern is not limited to a periodically changing pattern, and may be defined as, e.g., a pattern according to which the characteristic of light monotonically changes within a period corresponding to one symbol. In, e.g., a light emission pattern corresponding to symbol value '0', the characteristic of light monotonically changes such that light emitted by the illumination unit 14 has a first characteristic value at the start of a duration corresponding to the symbol and has a second characteristic value at the end of the duration. In, e.g., a light emission pattern corresponding to symbol value '1', the characteristic of light monotonically changes such that light emitted by the illumination unit 14 has a second characteristic value at the start of a duration corresponding to the symbol and has a first characteristic value at the end of the duration.

The length of one period of the light emission pattern is set, e.g., several times the reciprocal of the image capturing rate of the image capturing unit of the receiver 2 to allow the receiver to reproduce the light emission pattern. When, for example, the receiver has an image capturing rate of 30 frames/second, the length of one period of the light emission pattern is set to, e.g., 100 millisecond to 1 second.

The control unit 15, for example, divides information to be transmitted into bit strings including one or more bits and sets each bit string as one symbol. The control unit 15 reads data representing a light emission pattern corresponding to the symbol value from the storage unit 12. The control unit 15 sets a duration having a predetermined length for each symbol. The control unit 15 causes the illumination unit 14 to repeat the light emission pattern corresponding to the symbol value for one to several periods, in the duration.

The control unit 15 may place a predetermined symbol string (e.g., '01010101') as a preamble in a predetermined location of information to be transmitted, e.g., in its head. Alternatively, the control unit 15 may attach an error detecting code, such as the Cyclic Redundancy Check (CRC) code, to information to be transmitted. The symbol string and the error detecting code attached by the control unit 15 to information to be transmitted make it easy for the receiver 2 to accurately decode the transmitted information.

The control unit 15 may use various modulation schemes used in wireless communication, as the modulation scheme of a light emission pattern according to the symbol value. For example, the control unit 15 may associate one symbol with one bit. In this case, the control unit 15 makes a light emission pattern corresponding to symbol value '0' and a light emission pattern corresponding to symbol value '1' set out of phase with each other by 180°, as in Binary Phase-Shift Keying (BPSK) illustrated as FIG. 2.

The control unit 15 may associate two bits with one symbol. In this case, the control unit 15 may set light emission patterns according to which the characteristic of light periodically changes and which are 90° out of phase with each other, for each of four values ('00,''01', '10', and '11') that may be taken by the symbol, as in Quadriphase Phase-Shift Keying (QPSK).

Alternatively, the control unit 15 may modulate the change width (to be referred to as the amplitude level hereinafter) of the characteristic of light in accordance with the symbol value. In this case, the control unit 15 may set light emission patterns having different combinations of amplitude levels and phases, for each value that may be taken by the symbol, as in Quadrature Amplitude Modulation (QAM). In doing this, as for the amplitude level, the control unit 15 may monotonically increase the amplitude level in a duration corresponding to the symbol for a certain symbol value while monotonically decreasing the amplitude level in a duration corresponding to the symbol for another symbol value. Changing the amplitude level in accordance with the symbol value in a duration corresponding to one symbol in this way makes it easy for the receiver 2 to accurately identify a light emission pattern even when the amplitude level itself changes upon reflection or scattering, by the object 3, of light from the illumination unit 14.

The control unit 15 may multiplex information to be transmitted, using a plurality of light emission patterns having different frequencies (i.e., different periods). The control unit 15 may, for example, represent a symbol using a light emission pattern based on any of the above-mentioned modulation schemes, for each of a plurality of frequencies, and inversely Fourier-transform the light emission pattern of each frequency, as in Orthogonal Frequency-Division Multiplexing (OFDM). Inverse Fourier transformation exemplifies frequency-time conversion. The control unit 15 may then control the illumination unit 14 so that the illumination unit 14 changes the characteristic of light on a time-series basis in accordance with the light emission pattern obtained by frequency-time conversion.

Ambient light surrounding the transmitter 1 and, especially, light with periodically changing light emission characteristics may produce noise, thus degrading the decoding accuracy of transmitted information in the receiver 2. In view of this, the control unit 15 may spread information to be transmitted to a plurality of frequencies, as in spectrum spreading used in Code Division Multiple Access (CDMA). The control unit 15 may then control the illumination unit 14 so that the illumination unit 14 changes the characteristic of light on a time-series basis in accordance with the light emission pattern obtained by spreading information to be transmitted to a plurality of frequencies.

The characteristic of light that changes on a time-series basis in the light emission pattern will be described next.

The characteristic of light that changes on a time-series basis in a light emission pattern may be, e.g., light emission color, amount of light per unit time, or a combination of light emission color and amount of light per unit time.

When the characteristic of light that changes on a time-series basis in a light emission pattern is light emission color, for example, the control unit 15 sets a plurality of sampling points (e.g., 10 to 20 points) for one period of the light emission pattern. The control unit 15 obtains the values of color components at each sampling point when the values of the color components are sinusoidally changed in a color space representing the luminance component and the color components independently of each other, such as a YUV or HLS color space. The control unit 15 obtains the values of respective components of red, green, and blue in an RGB color space which can be associated with the light emission color of each light-emitting element of the illumination unit 14, from the values of the luminance component and the color components in the color space, for each sampling point. The control unit 15 determines the amount of light emitted per unit time by the light-emitting elements corresponding to the color components, in accordance with the values of respective components of red, green, and blue, for each sampling point. The control unit 15 preferably maintains the value of the luminance component constant. Thus, even when the color of light emitted by the illumination unit 14 changes on a time-series basis in accordance with the light emission pattern, the amount of light per unit time is maintained constant. Human vision is relatively sensitive to changes in amount of light but is relatively insensitive to changes in color. Therefore, maintaining the amount of light per unit time constant allows the control unit 15 to make it hard for humans to perceive changes in characteristic of light from the illumination unit 14, which take place on a time-series basis in accordance with the light emission pattern.

FIG. 5 illustrates graphs representing exemplary relationships of the temporal change in value of each component in a YUV color space and the temporal change in value of each component in an RGB color space, according to the light emission pattern.

On the left side of FIG. 5, the value of each component in the YUV color space according to the light emission pattern is represented. As illustrated as a top graph 501, the Y-component, i.e., the luminance component stays constant regardless of the elapsed time. As illustrated as a central graph 502, the value of the U-component i.e. a chrominance component changes with time in accordance with the light emission pattern. Similarly, as illustrated as a bottom graph 503, the value of the V-component, i.e. the other chrominance component also changes with time in accordance with the light emission pattern.

On the right side of FIG. 5, the value of each component in the RGB color space corresponding to the light emission pattern illustrated on the left side of FIG. 5 is represented. Graphs 511 to 513 represent temporal changes of red, green, and blue components, respectively. As illustrated as the graphs 511 to 513, each color component changes in accordance with the light emission pattern. The control unit 15 may preferably cause the light-emitting element corresponding to each color component in the illumination unit 14 to emit light by an amount of light emitted per unit time according to the value of this color component at each sampling point.

The control unit 15 preferably determines the values of the U- and V-components so that the change width of the amount of light emitted per unit time by each light-emitting element becomes about several percentages of the time average over the duration corresponding to one symbol of the amount of light emitted per unit time by this light-emitting element. This makes it harder for humans to perceive temporal changes in characteristic of light from the illumination unit 14 according to the light emission pattern.

When the characteristic of light that changes on a time-series basis in accordance with the light emission pattern is amount of light per unit time, for example, the control unit 15 sets a plurality of sampling points (e.g., 10 to 20 points) for one period of the light emission pattern. The control unit 15 may preferably determine the amount of light emitted per unit time by the light-emitting element of the illumination unit 14 at each sampling point, in accordance with the light emission pattern.

The control unit 15 may control each light-emitting element in accordance with, e.g., Pulse Width Modulation (PWM) so that the amount of light emitted per unit time by each light-emitting element of the illumination unit 14 becomes equal to the amount of light emitted at each sampling point determined in the above-mentioned manner. In PWM, the amount of light emitted by the light-emitting element is adjusted on the basis of the ratio (duty ratio) of the time for which the light-emitting element is kept ON to unit time. In this case, for example, each interval obtained by dividing one period of the light emission pattern into equal parts by the number of sampling points set for this period is an interval (having a length T) corresponding to one sampling point. The control unit 15 determines a time T for which the light-emitting element is kept ON in the interval T, in accordance with:

$$t = T \times n / M$$

where M is the maximum amount of light emitted per unit time by the light-emitting element, and n is the amount of light emitted per unit time at the sampling point.

FIG. 6A is a graph illustrating a temporal change in amount of light emitted per unit time by a light-emitting element, determined in accordance with the light emission pattern. FIG. 6A represents time on the abscissa and the amount of light on the ordinate. The graph 601 indicated by a dotted line represents a temporal change in amount of light emitted per unit time by a light-emitting element, determined in accordance with the light emission pattern. Each point 602 on the graph 601 represents a sampling point.

FIG. 6B illustrates graphs for explaining the relationships between the amount of light emitted by a light-emitting element and the duration for which a current is supplied to the light-emitting element, i.e., the duration for which the light-emitting element is kept ON, in PWM. FIG. 6B represents time on the abscissa and the current flowing through the light-emitting element on the ordinate. Graphs 611 and 612 each represent the relationship between time and the current flowing through the light-emitting element. For example, the amount of light emitted per unit time at a sampling point t1 in FIG. 6A is defined as n. In this case, the control unit 15 may preferably supply a current to the light-emitting element in an interval T×(n/M) continuous within the interval T corresponding to one sampling point, as represented as, e.g., the graph 611, to keep the light-emitting element ON so that the amount of light emitted per unit time becomes n. Alternatively, the control unit 15 may divide the interval in which a current is supplied to the light-emitting element into a plurality of subintervals P1, P2, and P3, in the interval T corresponding to one sampling point, as represented as the graph 612. In this case as well, the total length of these subintervals may preferably become T×(n/M).

To prevent humans from perceiving blinking of the light-emitting element based on PWM, the control unit 15 preferably sets the length T of the interval corresponding to one sampling point to 1/100 second or less, which makes it hard for the human eyes to see flicker caused by blinking. It is further preferable to set the length T of the interval shorter than the exposure duration for which the image capturing unit of the receiver 2 performs one image capturing operation. Thus, the region where an object irradiated with light from the illumination unit 14 is recorded in an image generated by the image capturing unit of the receiver 2 has a brightness according to the amount of light emitted by the illumination unit 14. Again to prevent humans from perceiving blinking of the light-emitting element based on PWM, the control unit 15 preferably sets the modulation frequency of the light-emitting element based on PWM to 500 Hz or more.

When the luminance of each light-emitting element of the illumination unit 14 can be adjusted with a period shorter than the length T of the interval corresponding to one sampling point, the control unit 15 may adjust the luminance of each light-emitting element to obtain an amount of emitted light corresponding to each sampling point.

FIG. 7 is a flowchart illustrating the operation of transmission process by the transmission device 1.

The control unit 15 of the transmitter 1 divides information to be transmitted for each symbol (step S101). The control unit 15 sets the duration for which a light emission pattern is superimposed, for each symbol (step S102). The control unit 15 selects the first symbol among symbols without being set as a simbol of interest, included in the information to be transmitted, as a symbol of interest (step S103). The control unit 15 determines a light emission pattern in accordance with the value of the symbol of interest (step S104).

The control unit 15 sets a plurality of sampling points for one period of the light emission pattern and determines the light emission intensity of each light-emitting element of the illumination unit 14, for each sampling point (step S105). The control unit 15 outputs to the illumination unit 14, a control signal representing the amount of light emitted per unit time by each light-emitting element, e.g., a control signal including the duty ratio, for each sampling point, and causes each light-emitting element of the illumination unit 14 to emit light by this amount of emitted light (step S106).

The control unit 15 determines whether any symbol remains to be of interest without being set as a symbol of interest (step S107). When any symbol without being set as a symbol of interest remains (Yes in step S107), the control unit 15 repeats the processes in step S103 and subsequent steps.

When no symbol remains (No in step S107), the control unit 15 ends transmission process.

Figure 8:
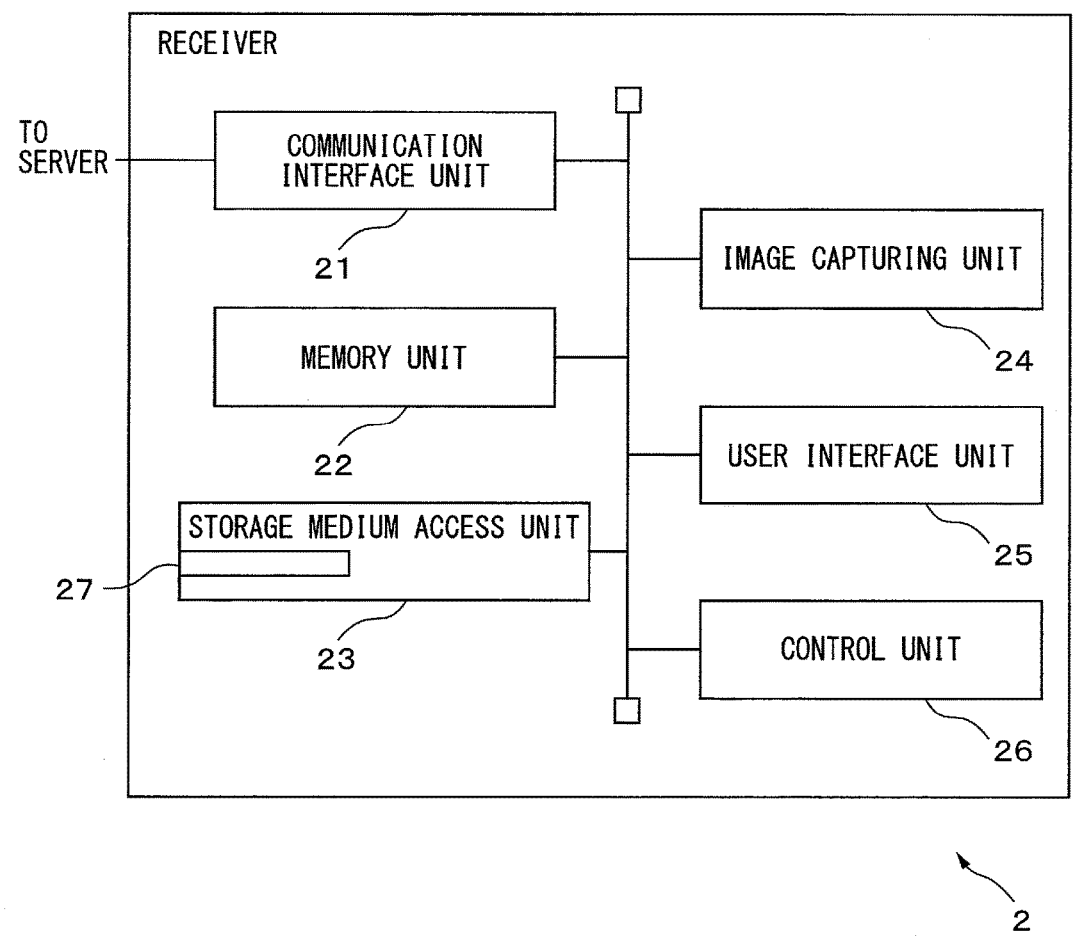
FIG. 8 is a block diagram illustrating the schematic configuration of a receiver used in the communication system illustrated as FIG. 1.

The receiver 2 will be described next. FIG. 8 is a block diagram illustrating the schematic configuration of the receiver 2. The receiver 2 may be implemented in, e.g., a portable terminal including an image capturing unit or a stationary device. The receiver 2 includes a communication interface unit 21, a storage unit 22, a storage medium access unit 23, an image capturing unit 24, a user interface unit 25, and a control unit 26. The receiver 2 analyzes a plurality of images obtained by capturing an image capturing range including at least a part of an area irradiated with light from the transmitter 1, a plurality of times on a time-series basis at a predetermined image capturing rate by the image capturing unit 24 to decode information transmitted by the transmitter 1.

The communication interface unit 21 includes, e.g., a communication interface for connecting the receiver 2 to a wired or wireless communication network, and its control circuit. The communication interface unit 21 transmits information received from the control unit 26 to another device, e.g., a server via the communication network. The communication interface unit 21 further transfers information received from the other device to the control unit 26.

The storage unit 22 includes, e.g., a read-only nonvolatile semiconductor memory and a readable/writable volatile semiconductor memory. The storage unit 22 stores, e.g., a plurality of images generated on a time-series basis by the image capturing unit 24, during reception process. The storage unit 22 further stores various types of information and programs used by the control unit 26 to perform reception process. The storage unit 22 may store information transmitted by the transmitter 1 and decoded.

The storage medium access unit 23 is, e.g., a device which accesses a storage medium 27 such as a magnetic disk, a semiconductor memory card, and an optical storage medium. The storage medium access unit 23, for example, reads and transfers to the control unit 26, a computer program for reception process, stored on the storage medium 27 and to be executed on the control unit 26.

The image capturing unit 24 includes an image sensor formed by a two-dimensional array of solid-state image sensing elements having a given sensitivity to light emitted by the illumination unit 14 of the transmitter 1, such as a CCD or CMOS image sensor, and an imaging optical system which forms an image of the image capturing range on the image sensor. The receiver 2 is preferably located such that at least a part of an area irradiated with light from the illumination unit 14 of the transmitter 1 falls within the image capturing range, e.g., the object 3 illustrated as FIG. 1 falls within the image capturing range. The image capturing unit 24 captures an image at a predetermined image capturing rate (e.g., 30 frames/second) to generate an image every time the image is captured, during reception process by the receiver 2. When a change in characteristic of light according to the light emission pattern superimposed in accordance with information to be transmitted is represented by a change in light emission color, the image generated by the image capturing unit 24 is preferably a color image.

The image capturing unit 24 outputs an image to the control unit 26 every time the image is generated.

The user interface unit 25 includes, e.g., a device for allowing humans to operate the receiver 2 or allowing the receiver 2 to display information to humans, such as a touch panel display. The user interface unit 25 outputs to the control unit 26, an operation signal based on a human operation, e.g., an operation signal to instruct the start of reception process. The user interface unit 25 further displays various types of information received from the control unit 26 and images generated by the image capturing unit 24. For example, the user interface unit 25 may display information transmitted from the transmitter 1 and decoded by reception process, together with images generated by the image capturing unit 24.

The control unit 26 includes one or more processors and its peripheral circuit. The control unit 26 controls the overall receiver 2. The control unit 26 performs frequency analysis of a plurality of images generated on a time-series basis by the image capturing unit 24 to decode information transmitted from the transmitter 1.

Figure 9:
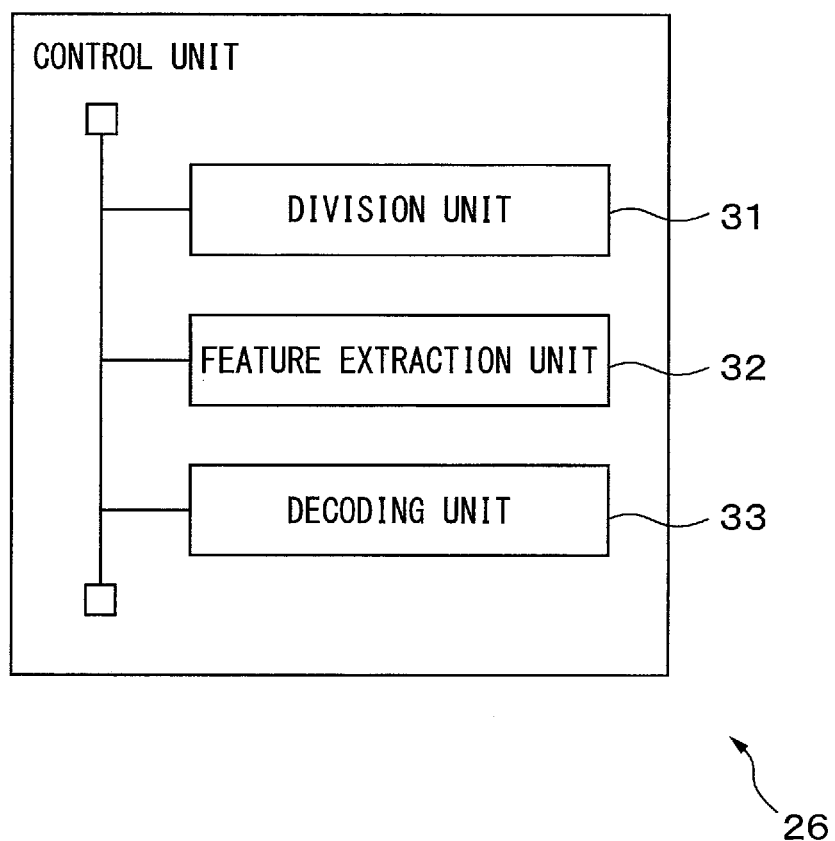
FIG. 9 is a functional block diagram illustrating a control unit of the receiver.

FIG. 9 is a functional block diagram illustrating the control unit 26 associated with reception process. The control unit 26 includes a division unit 31, a feature extraction unit 32, and a decoding unit 33. Each of these units of the control unit 26 is, e.g., a software module implemented by a computer program running on the processor of the control unit 26. Alternatively, each of these units of the control unit 26 may be built into the receiver 2 as firmware for implementing the functions of these units. Each of these units of the control unit 26 may be implemented as, e.g., a Web application running on the Web browser.

Figure 10:
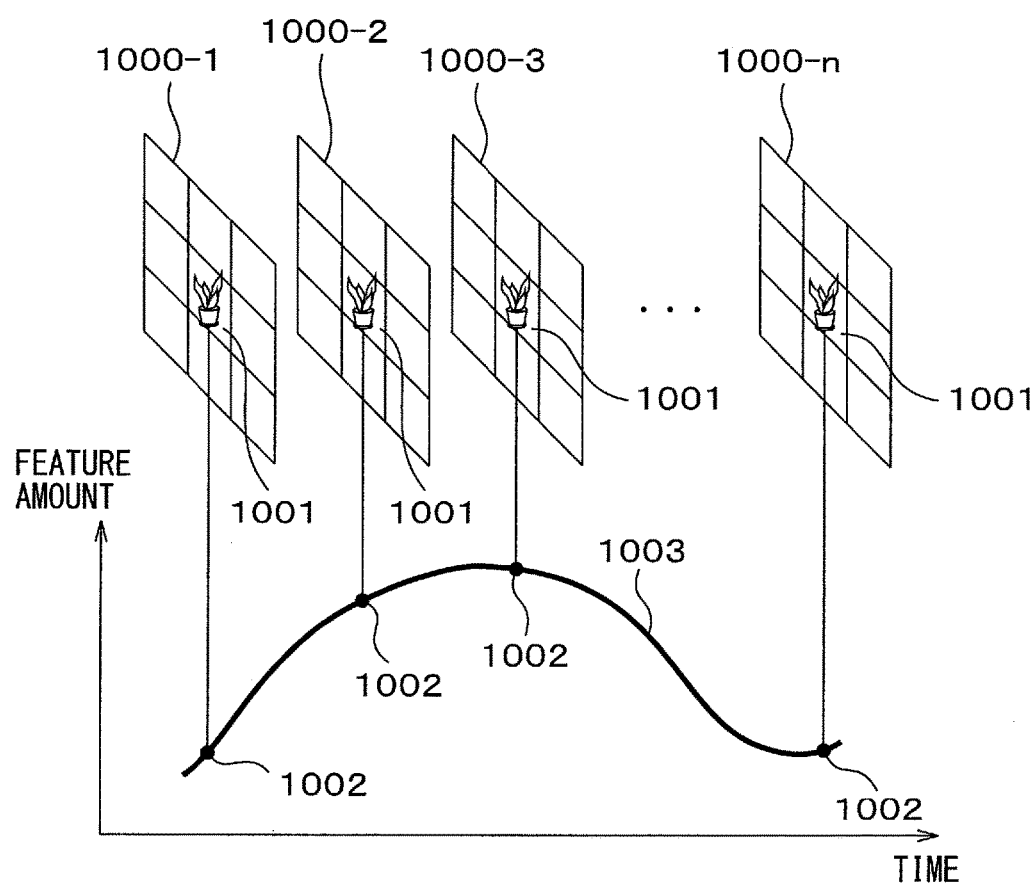
FIG. 10 is a conceptual diagram depicting reception process.

FIG. 10 is a conceptual diagram depicting reception process. When an object illuminated with light from the illumination unit 14 of the transmitter 1 is recorded in each image generated by the image capturing unit 24, the pixel value included in the region where the object is recorded is influenced by changes in characteristic of light emitted by the illumination unit 14. In view of this, the division unit 31 divides each of images 1000-1, 1000-2, 1000-3, . . . , 1000-$n$ generated by the image capturing unit 24 into a plurality of partial regions 1001. The feature extraction unit 32 extracts a feature amount 1002 representing the characteristic of light emitted by the illumination unit 14 from each partial region. The decoding unit 33 checks temporal changes in feature amount 1002 to identify a light emission pattern 1003. The decoding unit 33 decodes a symbol value corresponding to the light emission pattern 1003.

The division unit 31 divides each image into a plurality of partial regions. For example, the division unit 31 may divide each image into two to four parts in the horizontal and vertical directions. The division unit 31 may divide each image using a plurality of division methods. For example, the division unit 31 may divide each image into two parts in each of the horizontal and vertical directions to obtain four partial regions for each image, and divide each image into three parts in each of the horizontal and vertical directions to obtain nine partial regions for each image. This enhances the probability that a partial region can be selected such that a large part of the partial region is occupied by a region where an object illuminated with light from the transmitter 1 or the illumination unit 14 of the transmitter 1 itself is recorded.

The division unit 31 transfers information (e.g., the boundary positions between the partial regions) representing each partial region of each image to the feature extraction unit 32.

The feature extraction unit 32 extracts a feature amount representing the characteristic of light that changes on a time-series basis in accordance with the light emission pattern of light emitted by the illumination unit 14 of the transmitter 1 from each partial region of each image. When, for example, the characteristic of light that changes on a time-series basis is amount of light per unit time, the feature extraction unit 32 extracts as a feature amount, the average or median of luminance values of pixels in respective partial regions. When the characteristic of light that changes on a time-series basis is light emission color, the feature extraction unit 32 converts the value of each pixel of each partial region into a value in a YUV or HLS color space and calculates as a feature amount, the average or median of color components (e.g., U- or V-components or color phases) of respective pixels. When the value of each pixel of an image obtained by the image capturing unit 24 is represented in an RGB color space, the feature extraction unit 32 can calculate the average or median of color components by converting the value of each pixel of an image into a value in a YUV or HLS color space. The feature amount is not limited to the above-mentioned examples, and the feature extraction unit 32 may extract a variety of feature amounts which change on a time-series basis in accordance with the characteristic of light that changes in accordance with the light emission pattern, e.g., the sum, variance, or standard deviation of luminance values or specific color components in the partial region as a feature amount. Alternatively, the feature extraction unit 32 may extract as a feature amount the average in the partial region of the difference values between the pixel values of pixels located at identical positions in two temporally consecutive images.

The feature extraction unit 32 transfers the feature amount for each partial region of each image to the decoding unit 33.

The decoding unit 33 identifies a light emission pattern from time-series changes in feature amount extracted for each partial region and decodes a symbol value according to the light emission pattern.

As described above, when the characteristic of light emitted by the illumination unit 14 of the transmitter 1 periodically changes in accordance with the light emission pattern, temporal changes in feature amount of the partial region where an object illuminated by the transmitter 1 is recorded have a frequency component in the time-axis direction which corresponds to the change period of the light emission pattern. For example, when, as described above, the characteristic of light from the transmitter 1 sinusoidally changes, the frequency components of the feature amount in the time-axis direction include a specific frequency component corresponding to the sinusoidal wave.

In view of this, the decoding unit 33 generates a one-dimensional vector by arranging, on a time-series basis, feature amounts extracted from the partial regions, for each partial region where the same object is recorded in a plurality of images included in a duration of interest having the same length as the duration corresponding to one symbol. When the receiver 2 stands still and a stationary object exists in the image capturing range of the receiver 2, the partial regions where the same object is recorded in a plurality of images can be partial regions at identical positions in the images. The decoding unit 33 performs Fourier-transform on the one-dimensional vector. The decoding unit 33 extracts a spectrum including the same frequencies as those of the period of the light emission pattern from obtained frequency components, for each partial region.

The decoding unit 33 selects a partial region where the amplitude level of the extracted spectrum is maximized from the partial regions. Alternatively, the decoding unit 33 may select a partial region where the amplitude level of the extracted spectrum is equal to or higher than a predetermined threshold. Thus, the decoding unit 33 can select a partial region where an object illuminated by the transmitter 1 or the illumination unit 14 of the transmitter 1 itself is recorded. The decoding unit 33 detects a component having a value according to the light emission pattern, e.g., the phase or amplitude level of a periodical change in characteristic of light at a predetermined point in time in the duration of interest (e.g., at the start or end of the duration of interest), from the extracted spectrum, for the selected partial region.

The duration set for each symbol by the transmitter 1 may be different from the duration of interest. In view of this, the decoding unit 33 detects a component having a value according to the light emission pattern for each duration of interest by the above-mentioned process, while shifting the duration of interest on a time-series basis in steps of one frame. In this case, when the duration of interest coincides with the duration set for each symbol by the transmitter 1, the value of the detected component becomes an extremum, so that the decoding unit 33 may preferably set the extremum as a component having a value according to the light emission pattern. Once an extremum is obtained, the duration of interest corresponding to the extremum is considered to coincide with the duration corresponding to one symbol, so that the decoding unit 33 may preferably set subsequent durations of interest with reference to the duration of interest corresponding to the extremum. The decoding unit 33 detects a component having a value according to the light emission pattern, for each duration of interest.

The decoding unit 33 may specify a light emission pattern using a method other than the above-mentioned method. For example, the decoding unit 33 may identify a light emission pattern by obtaining the difference values of the feature amounts between temporarily adjacent images in the duration of interest and checking the change in feature amount on the basis of the obtained difference values.

The decoding unit 33 arranges the detected components on a time-series basis. When, as described above, information to be transmitted includes a predetermined symbol string (e.g., '01010101') as a preamble, the decoding unit 33 extracts a portion which coincides with a symbol string corresponding to the preamble from a sequence of detected components. The decoding unit 33 may preferably associate the components detected in the extracted portion with the symbol values such that the detected components coincide with the symbol values.

Alternatively, when information to be transmitted includes an error detecting code such as the CRC code, the decoding unit 33 may associate the detected components with the symbol values to minimize the error of the symbol using the error detecting code.

The decoding unit 33 may obtain symbol values according to the detected components by looking up a lookup table representing the correspondence between the detected components and the symbol values. The lookup table is stored in, e.g., the storage unit 22 in advance.

The decoding unit 33 decodes information to be transmitted by arranging the decoded symbol values in a predetermined sequence. The control unit 26 outputs the decoded information to another device via the communication interface unit 21. Alternatively, the control unit 26 performs process according to the decoded information. When, for example, the decoded information instructs to start a predetermined application, the control unit 26 starts the application. Alternatively, the control unit 26 may display the decoded information on the user interface unit 25.

Figure 11:
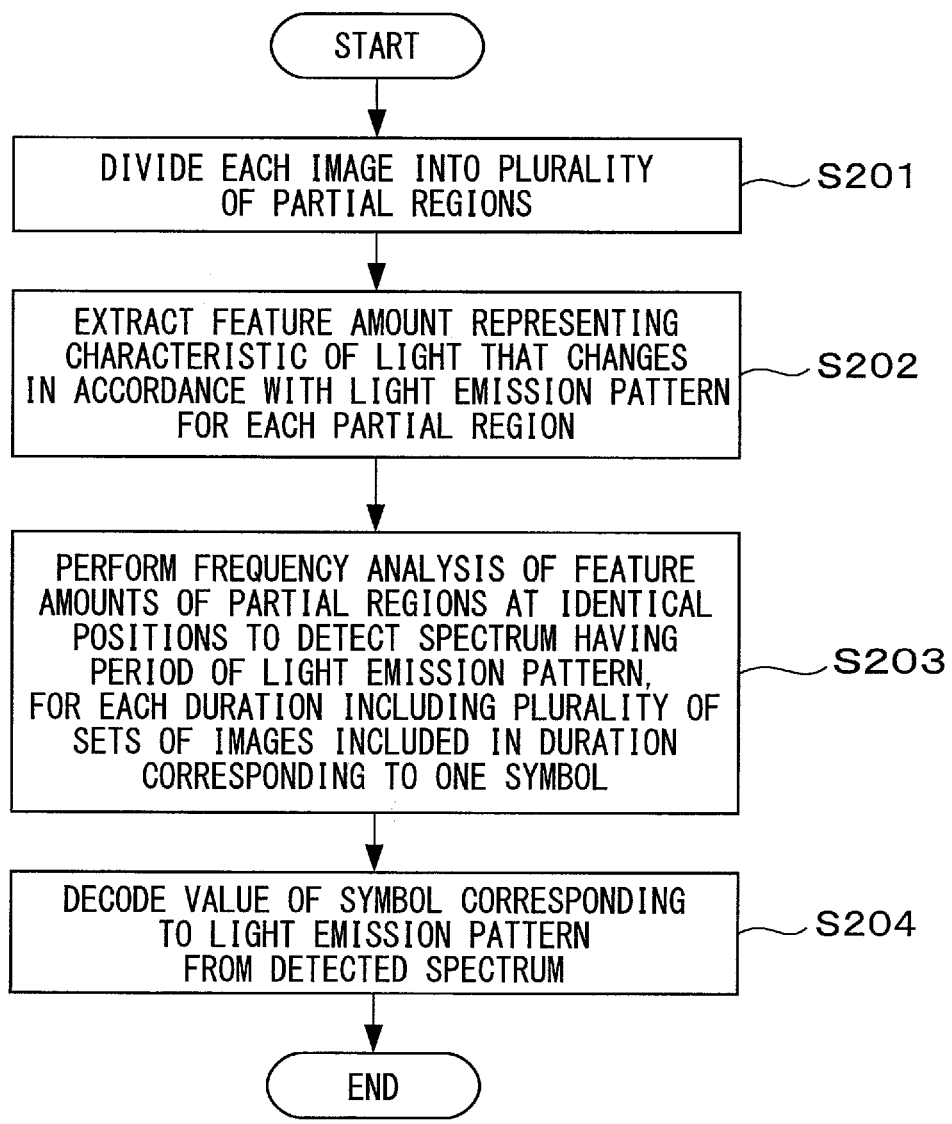
FIG. 11 is a flowchart illustrating the operation of reception process.

FIG. 11 is a flowchart illustrating the operation of reception process by the receiver 2.

The division unit 31 of the control unit 26 divides each image into a plurality of partial regions (step S201). The feature extraction unit 32 of the control unit 26 extracts a feature amount representing the characteristic of light that changes in accordance with the light emission pattern for each partial region (step S202).

The decoding unit 33 performs frequency analysis of the feature amounts of partial regions at identical positions to detect a spectrum having the period of the light emission pattern, for each duration including a plurality of sets of images included in the duration corresponding to one symbol (step S203). The decoding unit 33 decodes a symbol value corresponding to the light emission pattern from the detected spectrum to decode information to be transmitted, for each such duration (step S204). The control unit 26 ends reception process.

As described above, the communication system can superimpose information on light emitted by the transmitter and transmit it to the receiver. In the communication system, the light emission pattern that changes on a time-series basis is made different in accordance with the symbol value to superimpose information on light emitted by the transmitter. Therefore, even when the receiver may not directly receive light emitted by the transmitter, it can decode the information by detecting the light emission pattern that changes on a time-series basis. In addition, the communication system can transmit information even when changes in characteristic of light emitted by the transmitter upon the elapse of time are made moderate, and this makes it hard for humans to perceive changes in characteristic of light.

The receiver may include a terminal including an image capturing unit, and another device, e.g., a server connected to the terminal via a communication network. In this case, every time an image is generated, the terminal may transmit the image to the server via the communication network, together with identification information for specifying the terminal, e.g., the IP address of the terminal. The processor of the server may perform each process of the control unit of the receiver according to the above-described embodiment to decode information transmitted from the transmitter. The server may further return the decoded information to the terminal by referring to the identification information for specifying the terminal.

Alternatively, every time an image is generated, the processor of the terminal may perform such process of the image as done by the division unit 31 and the feature extraction unit 32, to extract a feature amount for each partial region. The terminal may transmit the feature amount for each partial region extracted from each image to the server via the communication network, together with identification information for specifying the terminal. The processor of the server may then perform such process as done by the decoding unit 33 of the receiver according to the above-described embodiment to decode information transmitted from the transmitter.

According to another modification in which the receiver is a portable receiver, even when an object illuminated by the transmitter stands still, the position of the object in the image may move with time upon movement of the receiver itself. In view of this, the control unit of the receiver may perform tracking process using, e.g., optical flow to specify partial regions where the same object is recorded in a plurality of images arranged on a time-series basis. The control unit of the receiver may cause the decoding unit to perform process using the feature amount extracted from the partial region where the same object is recorded in each image in the duration of interest. When the object illuminated by the transmitter can be a moving object, the control unit of the receiver may similarly cause the decoding unit to perform process using the feature amount extracted from the partial region where the same object specified by tracking process is recorded.

Thus, even when the receiver and the object illuminated by the transmitter move relative to each other, the receiver can accurately decode information transmitted from the transmitter.

According to still another modification, when the region where an object irradiated with light emitted by the illumination unit of the transmitter is recorded on an image generated by the image capturing unit of the receiver is expected to occupy a predetermined area or more, the process by the division unit in the receiver may be omitted. The predetermined area can be, e.g., half of the image size. In this case, the feature extraction unit may extract a feature amount from the entire image.

A computer program for causing a computer to implement each function of the control unit of the transmitter according to the above-described embodiment may be provided in a form recorded on a non-transitory computer-readable medium. Similarly, a computer program for causing a computer to implement each function of the control unit of the receiver according to the above-described embodiment may be provided in a form recorded on a non-transitory computer-readable medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A transmitter comprising:
a light source which enables changing a characteristic of light emitted by the light source, on a time-series basis; and
a controller which sets a predetermined duration for a symbol included in information to be transmitted and controls the light source to change the color of the light emitted by the light source in the duration without changing an amount of light emitted per unit time by the light source in the duration, on a time-series basis in accordance with a value of the symbol.

2. The transmitter according to claim 1, wherein the controller periodically changes the color of the light emitted by the light source, using a phase different for each value of the symbol.

3. The transmitter according to claim 1, wherein the controller periodically changes the color of the light emitted by the light source, using a combination of an amplitude level and a phase, the combination being different for each value of the symbol.

4. The transmitter according to claim 1, wherein the symbol comprises a plurality of symbols, and the controller sets a period different for each of the plurality of symbols, sets a change pattern on a time-series basis of the color of the light according to the value of the corresponding symbol, for each period, and changes the color of the light emitted by the light source in accordance with the change pattern on a time-series basis of the color of the light obtained by frequency-time conversion of the change pattern for each period.

5. A receiver comprising:
a camera which generates a plurality of images each recording an image capturing range with a predetermined image capturing period; and
a processor configured to:
divide each of the plurality of images generated by the camera into a plurality of partial regions;
extract a feature amount representing a characteristic of light emitted by a transmitter, changed on a time-series basis in accordance with a value of a symbol included in information to be transmitted, from each of the plurality of partial regions, for each of the plurality of images generated by the camera; and
decode the value of the symbol from a time-series change in the feature amount extracted from a partial region where an identical object is captured among the plurality of partial regions of each of the plurality of images included in a duration that is set for the symbol.

6. The receiver according to claim 5, wherein the decoding the value of the symbol performs time-frequency conversion of a vector generated by arranging, on a time-series basis, the feature amount extracted from the partial region where the identical object is captured of each of the plurality of images included in the duration, to obtain a spectral component of a frequency corresponding to a change period of the characteristic of the light emitted by the transmitter, which change in accordance with the value of the symbol, to decode the value of the symbol from the spectral component.

7. A communication system comprising:
a transmitter and a receiver,
the transmitter comprising:
a light source which enables changing a color of light emitted by the light source, on a time-series basis; and
a controller which sets a predetermined duration for a symbol included in information to be transmitted and controls the light source to change the color of the light emitted by the light source in the duration without changing an amount of light emitted per unit time by the light source in the duration, on a time-series basis in accordance with a value of the symbol, and the receiver comprising:
a camera which generates a plurality of images each recording an image capturing range comprising at least a part of an area irradiated with the light from the transmitter, with a predetermined image capturing period; and
a processor configured to:
extract a feature amount representing the color of the light from each of the plurality of images generated by the camera; and
decode the value of the symbol from a time-series change in the feature amount extracted from each of the plurality of images included in a duration that is set in accordance with the symbol.

8. A transmission method comprising:
setting a predetermined duration for a symbol included in information to be transmitted; and
controlling a light source which enables changing a color of light emitted by the light source, on a time-series basis, to change the color of the light emitted by the light source in the duration without changing an amount of light emitted per unit time by the light source in the duration, on a time-series basis in accordance with a value of the symbol in the duration.

9. A reception method comprising:
generating a plurality of images each recording an image capturing range with a predetermined image capturing period;
dividing each of the plurality of images into a plurality of partial regions;
extracting a feature amount representing a characteristic of light emitted by a transmitter, changed on a time-series basis in accordance with a value of a symbol included in information to be transmitted, from each of the plurality of images; and
decoding the value of the symbol from a time-series change in the feature amount extracted a partial region where an identical object is captured among the plurality of partial regions of from each of the plurality of images included in a duration that is set in accordance with the symbol.

* * * * *